United States Patent [19]

Shimoji et al.

[11] Patent Number: 4,787,808
[45] Date of Patent: Nov. 29, 1988

[54] TRAILER

[75] Inventors: Morio Shimoji, Hyogo; Masato Yokoyama, Shiga, both of Japan

[73] Assignee: Kabushiki Kaisha Suehiro Sharyo Seisakusho, Tokyo, Japan

[21] Appl. No.: 52,277

[22] Filed: May 21, 1987

[30] Foreign Application Priority Data

Oct. 13, 1986 [JP] Japan .................. 61-242838

[51] Int. Cl.$^4$ .............................. B65G 67/02
[52] U.S. Cl. .................. 414/531; 193/35 A; 193/35 MD; 414/536
[58] Field of Search ............ 414/529, 531, 536; 244/137.1; 193/35 A, 35 MD

[56] References Cited

U.S. PATENT DOCUMENTS 3,279,631 10/1966 McCartney ............ 414/536 X
3,684,108 8/1972 Olson .................... 414/531
4,541,768 9/1985 Walker et al. ......... 414/536 X

FOREIGN PATENT DOCUMENTS 58-48929 11/1983 Japan .

Primary Examiner—Robert J. Spar
Assistant Examiner—Stuart J. Millman
Attorney, Agent, or Firm—James E. Nilles

[57] ABSTRACT

A trailer wherein a body frame supports front and rear wheels rotatably at the left and right side portions thereof; a cargo base member has a plurality of rotors for transferring a cargo, arranged rotatably and in a mutually spaced manner on the cargo base member; and stoppers are provided at the front, rear, left and right portions of the body frame and the central portion of the cargo base member so that the stoppers can be vertically moved by operating rods connected to all of the stoppers for holding the cargo on the cargo base member. The front, rear, left and right stoppers are urged so that the stoppers normally project to a level higher than the upper surfaces of the rotors on the cargo base member. The central stopper is provided pivotably and movable vertically so that the cargo can be rotated easily on the cargo base member.

2 Claims, 5 Drawing Sheets

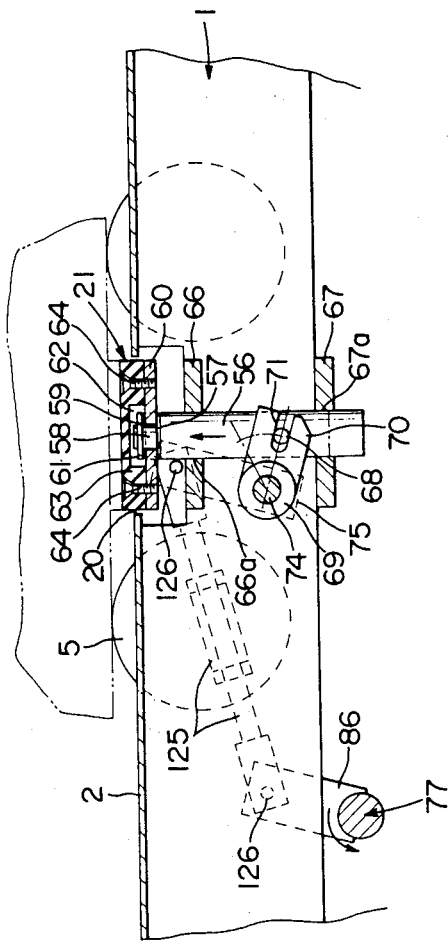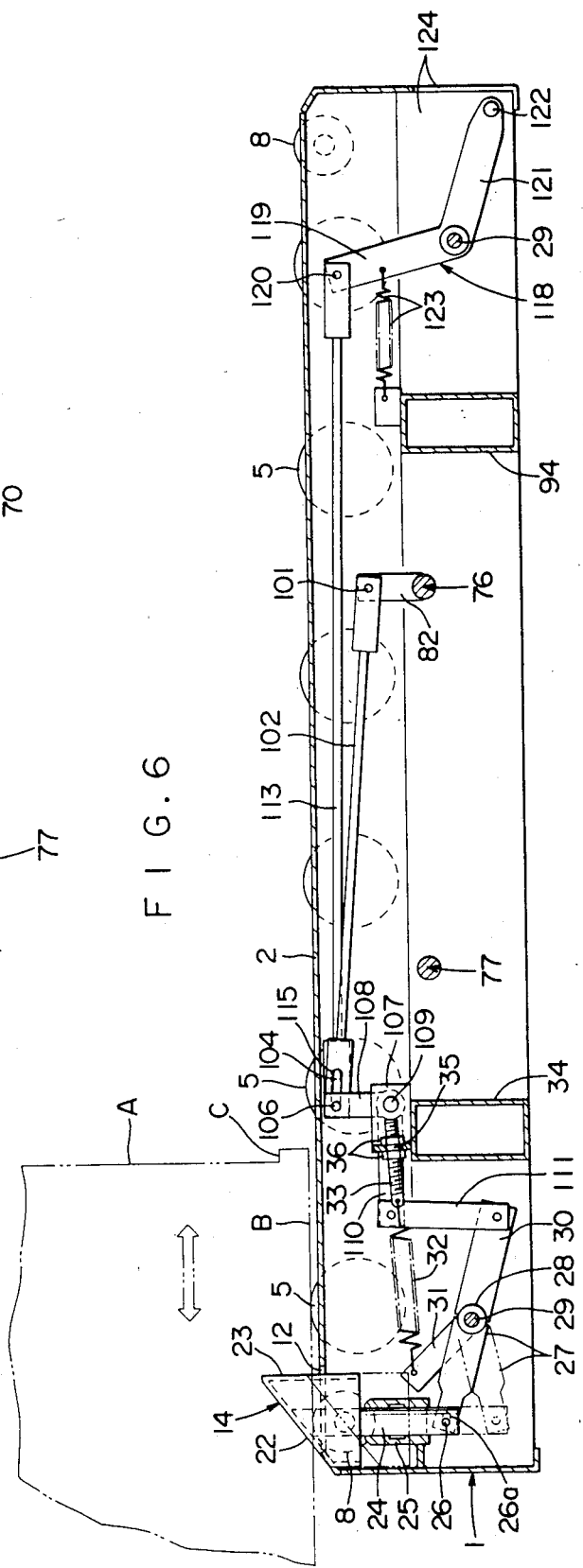

TRAILER

BACKGROUND OF THE INVENTION

1. Field of the Invention

This invention relates to a trailer, and more particularly to a trailer for use in sending a container into and taking out a container from an airplane.

2. Description of the Prior Art

A trailer the construction of which is described in, for example, the specificaiton of Japanese Utility Model Publication No. 48929/1983 is known as a conventional trailer of this kind. This trailer has a pivotable turntable consisting of a trailer body frame, and a plurality of rollers arranged in rows on the body frame in the longitudinal direction so that the rollers can be turned, and a fixed table which is provided iu front of this turntable via a recess, in which the turntable can be turned and which has thereon a plurality of rollers arranged in rows in the longitudinal direction in such a manner that these rollers can be turned. In order to load a container on this trailer, the container is sent onto the trailer in the longitudinal direction of the body frame. In order to unload the container, the turntable is turned horizontally so as to direct the rollers thereon in the transverse direction and send out the container by the resultant rollers.

When a trailer of such conventional construction is brought alongside a cargo carry-out portion of an airplane, it is necessary that the turntable be turned to direct the rollers to the carry-in side of the trailer so as to enable a container to be sent onto the trailer. After the container has been loaded onto the trailer, it is necessary to turn the turntable again and then transfer the container to an object place. When the container is unloaded from the trailer, it is necessary to further turn the turntable so that the rollers are directed to the carry-out side of the trailer. In order to send a container onto the trailer in the longitudinal direction thereof, it is not necessary to turn the turntable but it is necessary to turn the turntable when the container is thereafter carried out from the trailer.

In order that a container, which has been carried onto the trailer in any of the above-mentioned directions, can be carried out therefrom easily, it is necessary to turn the turntable for the purpose of meeting the requirement for setting the door of the container in a suitable direction. This causes problems to occur in the handling of a container to be carried out from and carried onto the trailer and the speed of loading and unloading a container onto and from the trailer. Pivotably providing the turntable on the body frame also has problems in the structure for setting the turntable thereon and the structure relative to the fixed table.

SUMMARY OF THE INVENTION

The present invention has been developed in view of these points. It is an object of the present invention to provide a trailer which is capable of carrying out the loading and unloading of a container easily and speedily, being operated easily, transporting a cargo stably, and thereby improving the operation efficiency and safety.

The trailer according to the present invention is provided with a body frame having left and right rotatable wheels at the front and rear portions thereof and a plurality of rotors for transferring a cargo, disposed in a mutually-spaced manner in a cargo base member, stoppers arranged at the front, rear, left and right portions of the body frame and the central portion of the cargo base member so that the stoppers can be vertically moved, operating rods operatively connected to these stoppers and adapted to move the front and rear stoppers and the left and right stoppers in the same directions and the central stopper in the direction opposite to the directions in which the front and rear stoppers and left and right stoppers are moved, and operating levers for turning these operating rods.

The rotor is the present invention means ball castors, universal wheel castors, and all sides rollers wherein a plurality of rollers rotatable in a direction normal to a rotary direction of a wheel are rotatably mounted on the peripheral portions of said wheel, for example.

The trailer according to the present invention is constructed as described above, so that in order to carry a container from an airplane onto this trailer, the trailer is brought alongside of a cargo carry-out portion of the airplane. The container is then sent from the cargo carry-out portion of the airplane toward one side stopper opposed to the cargo carry-out portion. The container then runs on this side stopper, so that the side stopper lowers due to the weight of the container. Consequently, the container runs over this side stopper to be carried onto the rotors in the cargo base member. During this time, the container passes the side stopper, which is then lifted automatically. As a result, the container is held by the left and right and front and rear stoppers so that the container does not fall from the cargo base member.

When the operating lever is then moved, the operating rods are moved, so that the front, rear, left and right stoppers operatively connected thereto are displaced at once to the level lower than a transfer plane formed by the rotors, the center stopper at the central portion of the cargo base member conversely moving up to press the bottom surface of the container in the upward direction. When the container in this condition is turned, it moves easily about the center stopper in the object direction owing to the rolling of the balls.

In order to unload the container from the cargo base member, the side stopper on the carry-out side of the trailer is lowered, so that the container can be carried out easily from the side of the lowered side stopper owing to the rotors.

The above and other objects as well as advantageous features of the invention will become apparent from the following description of the preferred embodiment taken in conjunction with the accompanying drawings.

BRIEF DESCRIPTION OF THE DRAWINGS

FIG. 6 is a sectional view of the operatively-connected portion of a side stopper; and FIG. 7 is a sectional view of the center stopper.

DESCRIPTION OF THE PREFERRED EMBODIMENT

Figure 1:
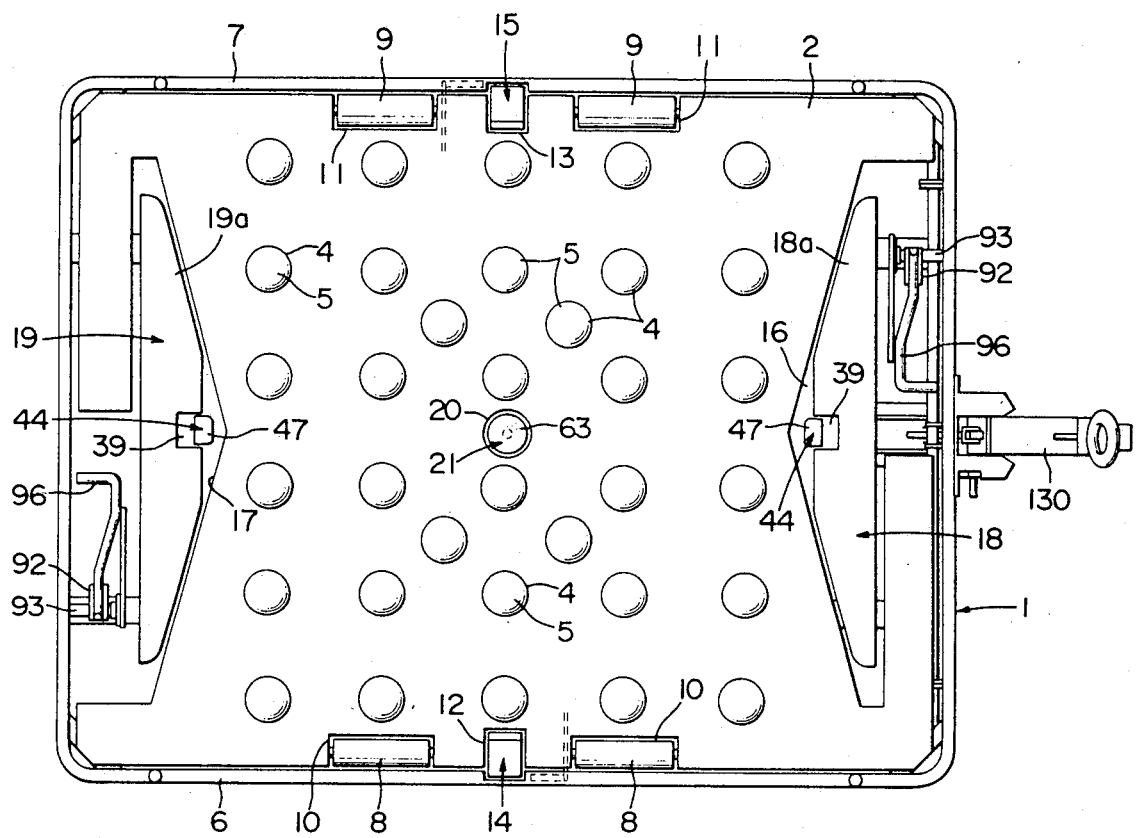
FIG. 1 is a plan view of a trailer.

Referring to the drawings, reference numeral 1 denotes a body frame provided with wheels 3 at the front, rear, left and right portions thereof so that the wheels 3 can be rotated. A cargo base member 2 of the body frame 1 is provided therein with a plurality of ball guide bores 4, in which rotors or balls 5 are rotatably provided. The upper or top surface portions of these balls 5 project beyond the upper surface of the cargo base member 2, and a transfer surface consisting of these balls 5 supports the bottom surface portion B of a container A. While the container A is transferred, the balls 5 support the container A as the balls 5 roll.

Figure 2:
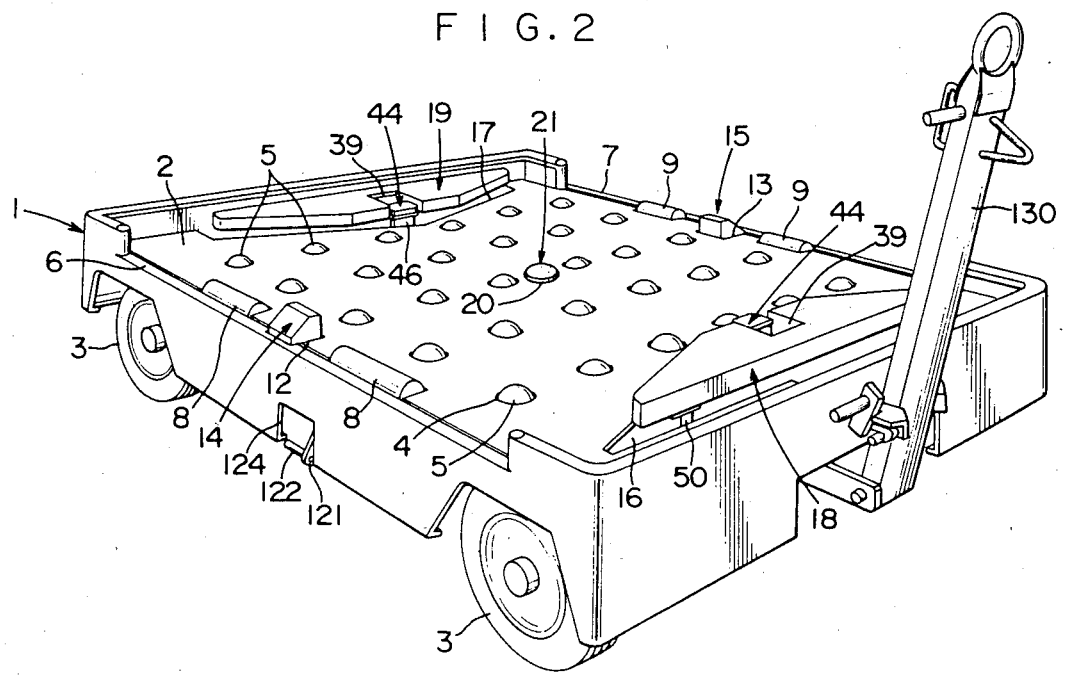
FIG. 2 is a perspective view of the trailer.

As shown in FIG. 2, the body frame 1 is provided at the left and right edge portions thereof with carry-in recesses 6, 7 which have bottom surfaces in the same level as the upper surface of the cargo base member 2. Guide rollers 8, 9, each pair of which are spaced from each other by a predetermined distance in the longitudinal direction, are provided rotatably in the portions of the cargo base member 2 which are on the inner side and in the vicinity of the left and right carry-in recesses 6, 7. These left and right guide rollers 8, 9 project upward at their upper surfaces from bores 10, 11, which are formed in the cargo base member 2, so that the upper surfaces of the rollers 8, 9 are flush with the transfer surface formed by the balls 5.

Guide bores 12, 13 are formed in the portions of the cargo base member 2 which are between the guide rollers 8, 9, which are provided in a longitudinally spaced manner on the left and right sides of the cargo base member 2. Side stoppers 14, 15 are provided in these left and right guide bores 12, 13 so that the side stoppers 14, 15 can be moved vertically with respect to the cargo base member 2. The cargo base member 2 is further provided in its front and rear portions with mountain-shaped recesses 16, 17, in which first and second guide members 18, 19 which constitute stoppers for guiding the container A being sent onto the cargo base member 2, and locking the container A thereon are provided so that the guide members 18, 19 can be moved vertically with respect to the cargo base member 2.

The cargo base member 2 is further provided in the central portion thereof with a guide bore 20, in which a center stopper 21 adapted to support the bottom surface B of the container A and press the same in the upward direction is provided so that the center stopper 21 can be moved vertically with respect to the cargo base member 2 and rotated.

Figure 3:
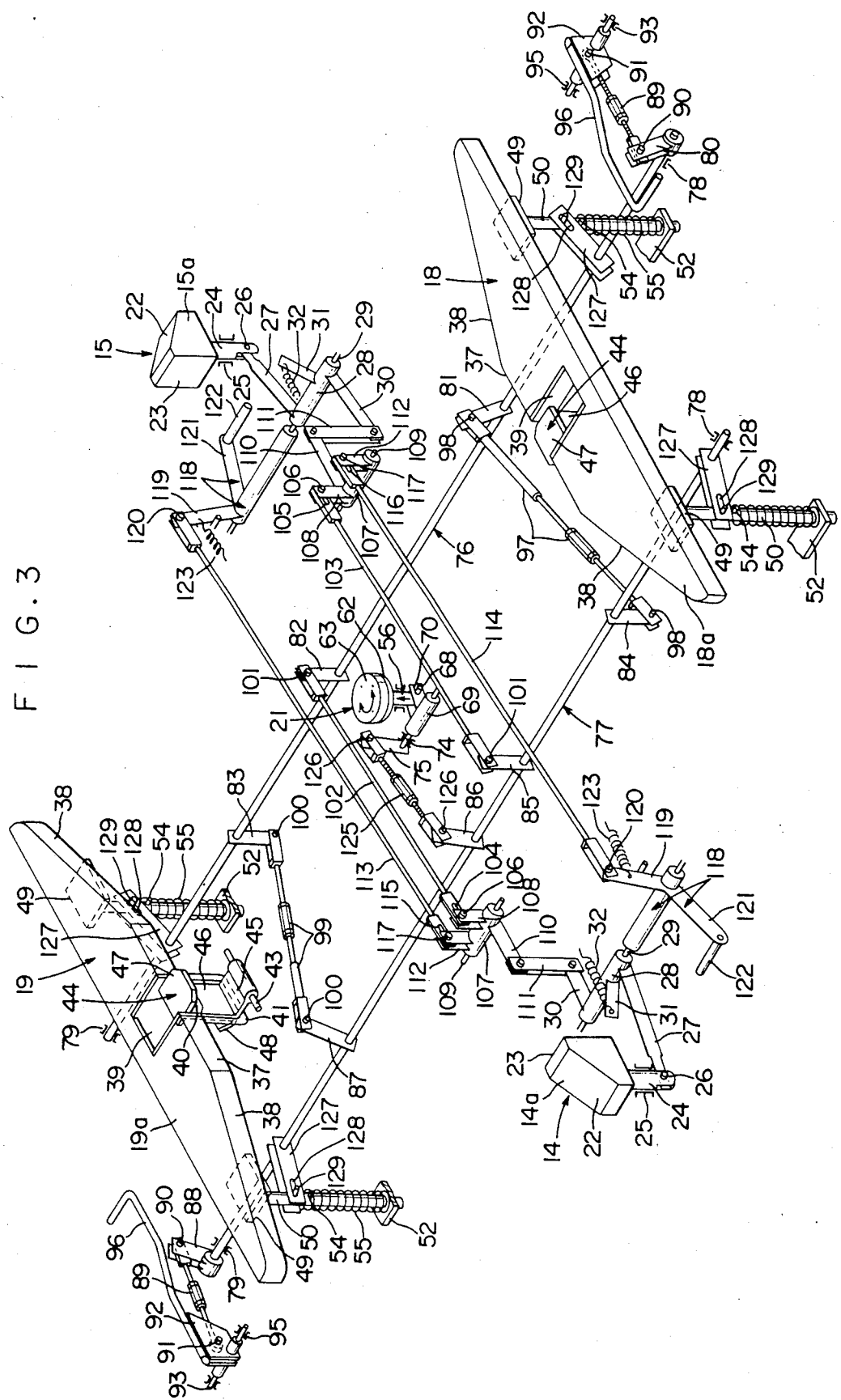
FIG. 3 is a perspective view of a mechanism for operatively connecting the stoppers.

As shown in FIGS. 3 and 6, each of the bodies 14a, 15a of the left and right side stoppers 14, 15 has an inclined guide surface 22 on its outer upper side, and a vertical locking surface 23 on the inner side, and substantially block type construction. Lift rods 24 projecting vertically from the lower surfaces of the side stopper bodies 14a, 15a are supported on bearings 25, which are fixed to the inner portions of the body frame 1, in such a manner that the lift rods 24 can be vertically moved. The outer end portions of operating arms 27 are joined pivotably to support shafts 26 inserted through elongated bores 26a which are formed in the lower end portions of these lift rods 24. The base end portions of the operating arms 27 are fixed to on end portion of each of the pivotable members 28, which are pivotably supported on shafts 29 supported on the body frame 1.

An interlocking member 30 projects inward from the other end portion of each of the pivotable members 28. One end portion of each of coiled springs 32 is fixed to each of the projections 31 extending from the intermediate portion of the relative pivotable member 28, and the other end portion of each of the coiled springs 32 to one end portion of each of screw rods 33. Each of the screw rods 33 is inserted through a guide member 35 of a frame member 34 on one side of the body frame 1 so that the screw rod 33 can be regulated in the axial direction thereof by front and rear nuts 36. The side stoppers 14, 15 are urged by these coiled springs 32 so that the side stoppers 14, 15 normally project upward beyond the transfer plane formed by the balls 5.

Figure 5:
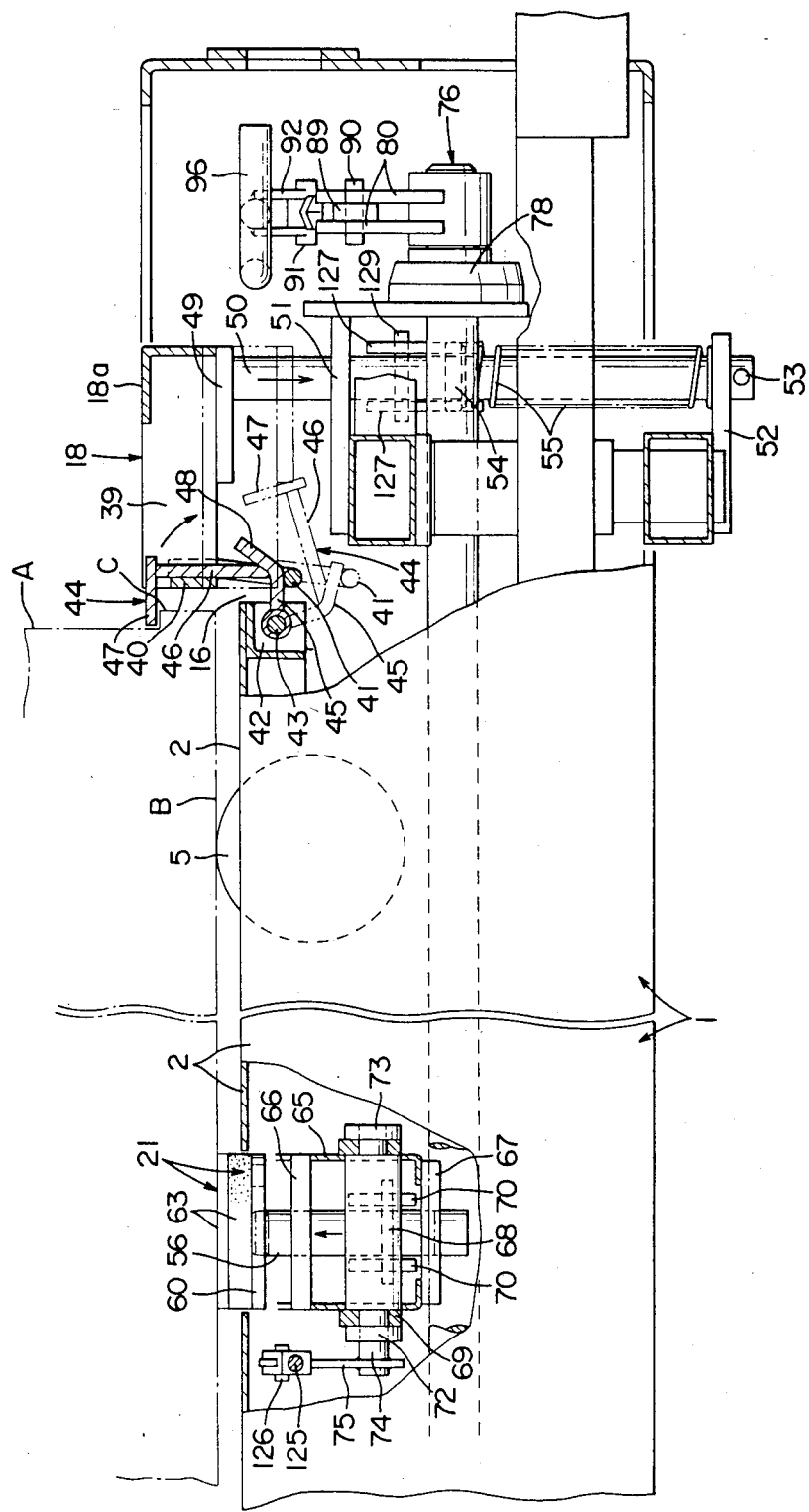
FIG. 5 is a sectional view of the center stopper and front stopper.

The first and second guide members 18, 19 are provided at the intermediate sections of the inner sides of the bodies 18a, 19a thereof with guide portions 37 as flat guide surfaces. Each of the guide member bodies 18a, 19a is further provided at the left and right sections of the inner side thereof with inclined guide portions 38 having outwardly divergent guide surfaces which are continuous with the relative guide portion 37, in such a manner that each guide member body has a substantially trapezoidal shape in plan. Each of the guide portions 37 of the bodies 18a, 19a is provided at its intermediate section with a guide recess 39, in which a support element 40 is fixed transversely between the front edge portions of the open end thereof. Both end portions of a substantially U-shaped interlocking frame 41 are fixed to the lower portions of both ends of the support element 40. A bearing member 42 is fixed at the lower portion of each of the recesses 16, 17 to the cargo base member 2 opposed to the interlocking frame 41, and the base end of a horizontal portion 45 of a stopper member 44 is supported pivotably on a fulcrum shaft 43 supported laterally on this bearing member 42. This stopper member 44 has a vertical portion 46 formed integrally with and extending upright from the substantially intermediate section of the horizontal portion 45, and a horizontal locking portion 47 connected at one end thereof to the upper end of the vertical portion 46, in such a manner that the stopper member 44 as a whole has a substantially C-shaped side elevation. The part of the stopper member 44 which is in the vicinity of a curved contact section 48 at the free end region of the horizontal portion 45 thereof is engaged with the upper surface of the horizontal portion of the interlocking frame 41. The vertical portion 46 is engaged with the outer side of the support element 40 as shown in FIG. 5, and the locking portion 47 is projected from the upper edge portion of the support element 40 toward the upper surface of the cargo base member 2. Lift rods 50 are fixed vertically to the lower portions of the parts of the guide member bodies 18a, 19a which are in the vicinity of both of the widthwise ends thereof, via fixing plates 49. Each of the left and right lift rods 50 is inserted at its upper and lower portions through upper and lower guide plates 51, 52, which are fixed on the left, right, front and rear portions of the body frame 1, in such a manner that the lift rod 50 can be vertically moved. A plate setting pin 53 projects from the lower end portion of the lift rod 50, and a coiled spring 55 is provided around the portion of the lift rod 50 which is between the lower guide plate 52 and a locking pin 54 projecting from an intermediate portion of the lift rod 50. Each of the first and second guide members 18, 19 at the front and rear portions of the cargo base member is retained resiliently in a position, in which the guide member projects upward from the transfer plane formed by the balls 5, owing to the left and right coiled springs 55. Each of the stopper members 44 is adapted to be lifted with the horizontal portion 45 thereof by the interlocking frame 41, and projected at the locking portion 47 thereof to a position on the inner side of and higher than the support element 40.

As shown in FIGS. 3, 5 and 7, the center stopper 21 has a lift rod 56, and a pivot 58 the diameter of which is smaller than that of the lift rod 56 projects from a diameter-reduced stepped portion 57 at the upper section of the lift rod 56. A pivotable disc 60 is mounted at its central portion on this pivot 58 via a slide plate 59 provided on the diameter-reduced stepped portion 57. A plate setting pin 61 is provided fixedly at the upper end portion of the pivot 58 which projects upward from the pivotable disc 60. An elastic support disc 63, which has in the central portion of its lower surface a recess 62 covering the upper end portion of the pivot 58, is superposed on the pivotable disc 60. This elastic support disc 63 is fixed to the pivotable disc 60 by a plurality of screws 64. The lift rod 56 is inserted through the bores 66a, 67a, which are provided in upper and lower bearing plates 66, 67 fixed to a support frame 65 in the body frame 1, in such a manner that the lift rod 56 can be vertically moved. Both end portions of an interlocking shaft 68 projecting from the lower portion of the lift rod 56 are engaged with locking recesses 71 in a pair of holding members 70, which project from a pivotable member 69. This pivotable member 69 is fixed to an interlocking shaft 74 pivotably supported by bearing members 72, 73 on the support frame 65, and one end portion of an interlocking member 75 is fixed to one end portion of this interlocking shaft 74.

Figure 4:
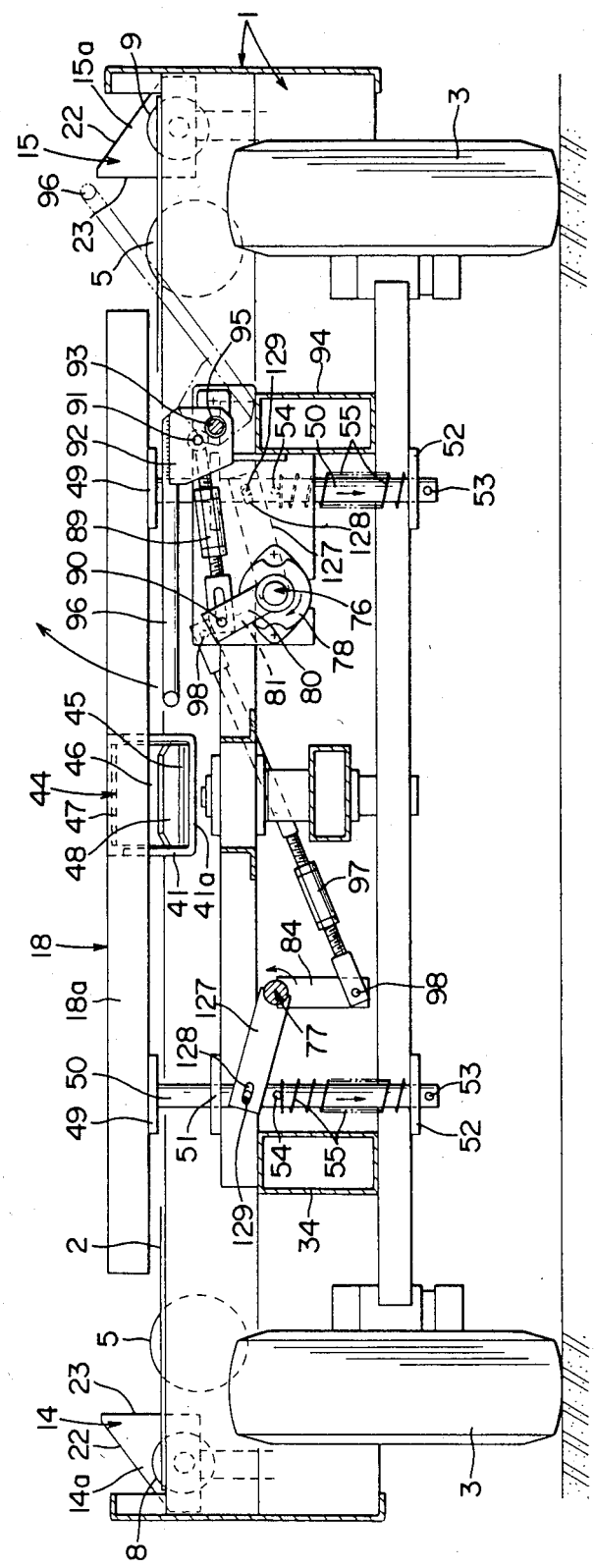
FIG. 4 is a partially-sectioned front elevation of the trailer.

As shown in FIGS. 3, 4 and 6, the longitudinally-extending first and second operating rods 76, 77 are supported pivotably in parallel with each other via bearing members 78, 79 at the lower portions of the left and right sides of the body frame 1.

The first operating rod 76 is provided thereon with first to fourth mounting members 80, 81, 82, 83, which are spaced at predetermined intervals in the axial direction of the operating rod 76, and which are fixed thereto in the direction which is at right angles to the operating rod 76. The second operating rod 77 is provided thereon with fifth to ninth mounting members 84, 85, 86, 87, 88, which are spaced at predetermined intervals in the axial direction of the operating rod 77, and which are fixed thereto in the direction which is at right angles t the operating rod 77.

At each of the diagonally opposite end portions of the first and second operating rods 76, 77, i.e., at each of the front end portion of the first operating rod 76 and the rear end portion of the second operating rod 77, a first interlocking rod 89, which consists of a turnbuckle, is engaged pivotably at one end portion thereof to the upper end portion of each of the first and ninth mounting members 80, 88 via a fulcrum shaft 90. A pivotable frame 92, which is engaged with the other end portion of this interlocking rod 89 via a fulcrum shaft 91, is supported on a connecting rod 93, both end portions of which are supported pivotably on a frame member 94 on the relative side of the body frame 1 via bearing members 95. An operating lever 96 is fixed at its base end portion to the pivotable frame 92.

A second interlocking rod 97 consisting of a turnbuckle is engaged pivotably at both end portions thereof with the upper end portion of the second mounting member 81 and the lower end portion of the fifth mounting member 84 via fulcrum shafts 98. A third interlocking rod 99 consisting of a turnbuckle is engaged pivotably at both end portions thereof with lower end portion of the fourth mounting member 83 and the upper end portion of the eighth mounting member 87 via fulcrum shafts 100.

Fourth and fifth interlocking rods 102, 103 are engaged at one end portion of each thereof with the upper end portions of the third and sixth mounting members 82, 85 via fulcrum shafts 101 so as to extend in the opposite directions. Connecting shafts 106 inserted through elongated bores 104, 105 in the opposite end portions of these fourth and fifth interlocking rods 102, 103 are supported pivotably by one projecting members 108 out of the two projecting members provided on each of left and right interlocking members 107, which are engaged pivotably with the left and right frame members 34, 94 via fulcrum shafts 109. An interlocking member 110 projects outward from one end portion of each of the left and right interlocking members 107, and an end portion of the interlocking member 30 of each of the pivotable members 28 is engaged pivotably with an end portion of relative interlocking member 110 via a link 111. Connecting shafts 117 inserted through elongated bores 115, 116 in the end portions of sixth and seventh connecting rods 113, 114 are supported pivotably on the other projecting members 112 of the left and right interlocking members 107. The base end portions of these sixth and seventh interlocking rods 113, 114 are engaged pivotably with one projecting members 119 out of two projecting members of pedal arms 118 via fulcrum shafts 120. Each of the left and right pedal arms 118 has two projecting members 119, 121, and is formed so as to have an L-shaped side elevation, a pedal 122 being fixed to each of the projecting members 121. The left and right pedal arms 118 are joined pivotably to the shaft rods 29, and supported resiliently by coiled springs 123 provided between the projecting members 119 and frame members 34, 94. Each of the pedals 122 is provided in an operating recess 124 formed in the wall at each of the left and right sides of the body frame 1.

An eighth interlocking rod 125 consisting of a turnbuckle is engaged pivotably at both end portions thereof with the upper end portion of the seventh mounting member 86 and the upper end portion of the interlocking rod 75 of the center stopper 21 via fulcrum shafts 126.

The base end portions of interlocking arms 127 are fixed to the portions of the first and second operating rods 76, 77 which are in the vicinity of both ends thereof, and interlocking pins 129, which project from the lift rods 50 in the front and rear guide members, i.e. the first and second guide members 18, 19, are inserted through elongated bores 128 formed in the end portions of these interlocking arms 127. A reference numeral 130 in the drawings denotes a traction bar fixed to the front portion of the body frame 1 so that it can be raised in the vertical direction.

The operation of the above-described structure will now be described.

In order to load, for example, a container A onto the cargo base member 2, the trailer is brought alongside an exit, for example, a cargo carry-out portion of an airplane. During this time, the left and right side stoppers 14, 15, longitudinally spaced first and second guide members 18, 19, and locking portions 47 of the stopper members 44 for these guide members 18, 19 project upward to a level higher than the transfer plane formed by the balls 5 in the cargo base member 2, while the center stopper 21 is in a level lower than this transfer plane.

The container A is then carried from the cargo carry-out portion onto, for example, one side stopper 14, which is opposed to the cargo carry-out portion, so that the carry-in side portion of the bottom part of the container A runs on the inclined guide surface 22 of the same side stopper 14. Consequently, this side stopper 14 is lowered automatically by the weight of the container A against the coiled spring 32, and the carry-in portion of the container A is supported on the guide rollers 8 provided on the front and rear sides of this side stopper 14.

In this case, when the side stopper 14 is lowered against the coiled spring 32, the pivotable member 28 is turned around the shaft rod 29 via the operating arm 27, and the interlocking member 30 of this pivotable member 28 raises the interlocking member 110 via the link 111. As a result, the interlocking member 107 having this interlocking member 110 is turned around the fulcrum shaft 109, and the connecting shaft 106 for one projecting member 108 on the interlocking member 107 is moved axially inward (widthwise direction of the body frame 1) in the elongated bore 104 in the fourth interlocking rod 102, the connecting shaft 117 for the other projecting member 112 being moved in the same direction in the elongated bore 115 in the sixth interlocking rod 113. Therefore, the lowering of the side stopper 14 does not cause the fourth and sixth interlocking rods 102, 113 to be operatively connected, so that the first operating rod 76 is not turned. Consequently, the other side stopper 15 is not lowered and remains to project upward from the transfer plane formed by the balls 5.

When the container A supported on the guide rollers 8, which are provided on the front and rear sides of the stopper 14 thus lowered, is pushed toward the other side stopper 15, the container A is guided by the guide rollers 8 and balls 5 and carried onto the upper surface of the cargo base member 2, and the side surface portion on the carry-in side of the container A engages the vertical locking surface 23 of the side stopper 15, the side stopper 14 which the container A has just passed being then lifted automatically.

During this time, if one side portion, for example, the front portion on the carry-in side of the container A contacts the inclined guide portion 38 on the carry-in side of the first guide member 18, the container A is sent to the inner portion of the cargo base member 2 with the front portion of the container moving along the same inclined guide portion 38. While the container A moves in this manner, the posture of the container A being sent inward is corrected. When the carry-in side portion of the container A then engages the locking surface 23 of the side stopper 15, the container A is placed in order between the front and rear guide members, i.e., between the flat guide portions 37, 37 of the first and second guide members 18, 19. When the container A has been sent to the position between these front and rear flat guide portions 37, the locking portions 47 of the front and rear stopper members 44 provided on the first and second guide members 18, 19 automatically engage locking projections C formed at the lower portions of the front and rear sides of the container A, so that the container A is locked automatically by the front and rear stopper members 44. The container A is thus loaded on the cargo base member 2.

In order to turn the container A on the cargo base member 2, either of the front and rear operating levers 96, for example, the operating lever 96 provided on the front end of the first operating rod 76 is turned from the inner side to the outer side. Consequently, the pivotable frame 92 having this operating lever 96 is turned in the outward direction around the connecting shaft 93, and the first operating rod 76 is turned via the first mounting member 80 which is drawn by the first interlocking rod 89. The turning of this first operating rod 76 causes the second operating rod 77 to be turned via the fifth mounting member 84, which is drawn by the second interlocking rod 97, and the eighth mounting member 87, which is drawn by the third interlocking rod 99.

When the first and second operating rods 76, 77 are thus turned, the front, rear, left and right interlocking arms 127 are turned down, and the relative lift rods 50 are moved down simultaneously against the coiled springs 55 with the first and second guide members 18, 19 which are provided at the front and rear sides of the cargo base member moved down to the level lower than the transfer plane formed by the balls 5.

Simultaneously with the lowering of the first and second guide members 18, 19, the respective interlocking frames 41 are moved down, and the front and rear stopper members 44, the horizontal portions 45 of which are supported on the front and rear interlocking frames 41, are turned down automatically around the fulcrum shafts 43 due to the weights of the stopper members 44. In consequence, the locking portions 47 at the upper end sections of the stopper members 44 are disengaged from the locking projections C of the container A and returned to the interior of the guide recesses 39. As a result, the locking projections C at the front and rear portions of the container A are unlocked.

When the first operating rod 76 is turned as mentioned above, one interlocking member 107 is turned around the fulcrum shaft 109 via one projecting member 108 which is drawn by the fourth interlocking rod 102 joined pivotably to the third mounting member 82, and, when the second operating rod 77 is turned as mentioned above, the other interlocking member 107 is turned around the relative fulcrum shaft 109 via one projecting member 108 which is drawn by the fifth interlocking rod 103 joined pivotably to the sixth mounting member 85. When the interlocking members 107 on the left and right sides are turned simultaneously, the links 111 are raised by the interlocking members 110 connected to these interlocking members 107, and the pivotable members 28 are turned around the shaft rods 29 against the coiled springs 32 via the interlocking members 30. The operating arms 27 extending from these pivotable members 28 then cause the lift rods 24 in the left and right side stoppers 14, 15 to be moved down, so that the side stoppers 14, 15 lower to the level which is lower than the transfer plane formed by the balls 5.

If the left and right interlocking members 107 are turned by the fourth and fifth interlocking rods 102, 103, the connecting shafts 117 supported by the other projecting members 112 on the left and right interlocking members 107 are moved in the elongated bore 115 in the sixth interlocking rod 113 and elongated bore 116 in the seventh interlocking rod 114. Accordingly, the sixth and seventh interlocking rods 113, 114 are not moved in accordance with the pivotal movements of the interlocking members 107, and the left and right pedals 122 are not moved.

When the second operating rod 77 is turned as mentioned above, the pivotable member 69 is turned via the interlocking member 75 which is drawn by the eighth interlocking rod 125 joined pivotably to the seventh mounting member 86, and a pair of holding members 70 on the pivotable member 69 are turned up, so that the lift rod 56 for the center stopper 21 is raised via the interlocking shaft 68. The center stopper 21 is thus moved up from the level lower than the transfer plane formed by the balls 5, to be pressed against the bottom portion B of the container A, and the center stopper 21 thus supports the central region of the bottom portion B of the container A.

Thus, the left and right stoppers 14, 15 and the front and rear guide members, i.e. the first and second guide members 18, 19 having stopper members 44 are moved back by the pivotal movements of the operating lever 96, from the transfer plane, which is formed by the balls 5 in the cargo base member 2, via the first and second operating rods 76, 77 while the center stopper 21 projects upward from this transfer plane to support the central region of the bottom portion B of the container A. This enables the container A to be turned easily around the center of pivotal movement of the center stopper owing to the rolling of the balls 5 and set in an arbitrary position on the cargo base member or in such a manner that the container A faces in an arbitrary direction.

When the operating lever 96 is turned to their original position, the left and right side stoppers 14, 15 and the front and rear guide members, i.e. the first and second guide members 18, 19 are returned to the positions on the transfer plane, while the center stopper 21 is returned to the position lower than the transfer plane.

In order to unload the container A from the cargo base member 2, the pedal 122 provided on the side, which is opposite to the side from which the container A is to be unloaded, for example, the pedal 122 provided on the side of the side stopper 14 is stepped. Consequently, the relative pedal arm 118 is turned around the shaft rod 29 against the coiled spring 123, and the seventh interlocking rod 114 is drawn by the projecting member 119, the relative interlocking member 107 being then turned around the fulcrum shaft 109 via the projecting member 112 on the interlocking member 107 by the movement of this seventh interlocking rod 114. In accordance with the turning of the interlocking member 107, the pivotable member 28 is turned around the shaft rod 29 against the coiled spring 32 via the interlocking member 110, link 111 and interlocking member 30. Due to the downward pivotal movement of the operating arm 27 extending from the pivotable member 28, the side stopper 15 provided on the side from which the container A is to be unloaded is lowered via the lift rod 24 to the position lower than the transfer plane formed by the balls 5.

If the interlocking member 107 on the side of the other side stopper 15 is turned in this case, the connecting shaft 106 on the relative projecting member 108 extending from the interlocking member 107 is moved inward in the elongated bore 105 in the fifth interlocking rod 103, and fifth interlocking rod 103 is not pushed by the connecting shaft 106. The pedal 122 on the side of this side stopper 15 is not also moved in accordance with the movement of the interlocking member 107, nor is the side stopper 14 lowered.

When the container A is pushed toward the side stopper 15, it is moved smoothly by the balls 5, and unloaded lightly owing to these balls 5 and the front and rear guide rollers 9 on the unloading side of the cargo base member.

In the preferred embodiment a number of balls 5 are used for transferring the cargo onto the cargo base member 2. However, it is appreciated that the present invention is not limited to the use of balls 5 and, of course, other suitable means can be used.

According to the present invention, cargo, such as a container can be carried from a side portion of a trailer, which is brought alongside of an airplane, onto the upper surface of a cargo base member of the trailer automatically. Cargo, such as a container on the cargo base member can be turned smoothly without being obstructed by any stoppers, so that the direction in which the door of the container faces can be changed easily. Moreover, cargo, such as a container can be carried out smoothly from the upper surface of the cargo base member without turning the cargo base member. Since each stopper can be moved by the operations of the operating levers, the trailer can be handled easily.

Therefore, the loading and unloading operations can be carried out easily and speedily, and a cargo can be transported safely owing to the stoppers. This enables the operation efficiency and safety of the trailer to be greatly improved.

What is claimed is:

1. A trailer comprising:
a body frame supported by wheels rotatably mounted at front and rear, and left and right side portions thereof, said frame having
an upper surface portion, and
a cargo base member on said upper surface portion;
a plurality of rotors for supporting and facilitating the transfer of a cargo container onto and off of the trailer, said rotors
being rotatably mounted on said cargo base member in spaced relation relative to each other, and
each having a top surface portion located above said cargo base member;
side stoppers mounted on said left and right side portions of said body frame, to be freely movable vertically with respect to each of said rotors between
a lower position allowing the container to be loaded and a higher position projecting to a level above said top surface of each of said rotors, said side stoppers each having
an outwardly inclined side guide surface at an upper side thereof for guiding the container as it is being loaded onto the trailer, and
a vertical locking surface at an inner side thereof for stopping the container when it has been loaded onto the trailer;
a spring means mounted to normally bias said side stoppers to said higher position;
front and rear stoppers mounted at said front and rear portions of said body frame to be movable vertically with respect to each of said rotors on said cargo base member, said front and rear stoppers having
front and rear guide surfaces respectively for guiding the container as it is being loaded, and
locking portions for locking the container on said trainer after loading;

a central stopper mounted on a central portion of said cargo base member for vertical and rotational movement relative thereto and having an upper portion and a support member mounted on said upper portion;

means for selectively lowering said central stopper and associated support member below said rotor top surfaces when the container is being loaded and for moving said central stopper up to cause said support member to engage and support the bottom of the container to permit rotation of the container when required;

first and second operating rods rotatably mounted on said body frame and interconnected with all of said stoppers,
to move said front, rear, left and right stoppers in the same vertical direction, and also automatically to move said central stopper in a vertical direction which is opposite to the vertical direction in which said front, rear, left and right stoppers are moved; and an operating lever means connected to rotate said operating rods to either cause
said front, rear, left and right stoppers to rise while also automatically causing said central stopper to lower to permit the container to be guided onto and locked into position on said trailer, or
cause said front, rear, left and right stoppers to lower while also automatically causing said central stopper to move up and support said container for rotation thereof.

2. A trailer according to claim 1, wherein said upper support member is rotatably mounted on said central stopper upper portion and included an elastic support disc.

* * * * *